(12) United States Patent
Yang

(10) Patent No.: US 11,002,423 B1
(45) Date of Patent: May 11, 2021

(54) GLASS LED BULB AND METHOD OF PRODUCTION

(71) Applicant: Lamues Light Enterprise Co., LTD, Phnom Penh (KH)

(72) Inventor: Feng Yang, Dongguan (CN)

(73) Assignee: Lamues Light Enterprise Co., LTD, Phnom Penh (KH)

( * ) Notice: Subject to any disclaimer, the term of this patent is extended or adjusted under 35 U.S.C. 154(b) by 0 days.

(21) Appl. No.: 16/909,257

(22) Filed: Jun. 23, 2020

(51) Int. Cl.
  *F21V 21/00* (2006.01)
  *F21V 3/06* (2018.01)
  *C03B 23/18* (2006.01)
  *F21K 9/90* (2016.01)
  *F21V 31/00* (2006.01)
  *F21V 23/00* (2015.01)
  *F21Y 115/10* (2016.01)

(52) U.S. Cl.
  CPC ............. *F21V 3/061* (2018.02); *C03B 23/18* (2013.01); *F21K 9/90* (2013.01); *F21V 23/001* (2013.01); *F21V 31/005* (2013.01); *F21Y 2115/10* (2016.08)

(58) Field of Classification Search
  CPC ...... F21V 3/061; F21V 23/001; F21V 31/005; C03B 23/18; F21K 9/90; F21Y 2115/10
  USPC .......................................................... 362/363
  See application file for complete search history.

(56) References Cited

U.S. PATENT DOCUMENTS

| 9,267,651 | B2 * | 2/2016 | Tseng | F21K 9/20 |
| 9,784,442 | B2 | 10/2017 | Altamura | |
| 9,803,851 | B2 * | 10/2017 | Loomis | F21V 3/02 |
| 9,900,968 | B2 | 2/2018 | Altamura | |
| 10,295,129 | B2 | 5/2019 | McWhirter | |
| 10,393,351 | B2 | 8/2019 | Chen | |
| 2013/0182439 | A1 * | 7/2013 | Tsai | F21S 4/10 362/249.06 |
| 2019/0338891 | A1 | 11/2019 | Heil | |

OTHER PUBLICATIONS

"Mini Glass No Flicker 3W Dimmable G9 LED Bulb COB SMD LED Light Crystal Chandelier LED Source Replace 30w Incandesent Lamps: No Flicker: Led Sourcecob Smd Led—AliExpress." Aliexpress. com, www.aliexpress.com/item/32810280460.html.

* cited by examiner

*Primary Examiner* — Laura K Tso
(74) *Attorney, Agent, or Firm* — Fish IP Law. LLP

(57) ABSTRACT

A light device comprising a light emitting diode (LED) enclosed in a glass tube is described. The first closed end of the glass tube has a tapered cross section with a conical shape and a ball at the tip. The second closed end of the glass tube has a melted region encasing a pair of lead wires that pass into the lumen of the glass tube and connect to the LED.

9 Claims, 3 Drawing Sheets

GLASS LED BULB AND METHOD OF PRODUCTION

FIELD OF THE INVENTION

The field of the invention is lights, more specifically, miniature glass led bulbs and their method of production.

BACKGROUND

The background description includes information that may be useful in understanding the present invention. It is not an admission that any of the information provided herein is prior art or relevant to the presently claimed invention, or that any publication specifically or implicitly referenced is prior art.

Miniature tungsten filament bulbs have a long history of commercial success in the lighting market and they are still a popular choice for Christmas lights. With the rise of popularity in the more energy efficient light emitting diode (LED) lights, there is a need for an LED bulb to replace the well-recognized design of the miniature tungsten filament bulbs.

Several examples of miniature LED bulbs are disclosed in U.S. Pat. Nos. 9,784,442, 9,900,968, 10,295,129, and 10,393,351. Unfortunately, these designs are overly complex and require a rigid base or socket component affixed with the glass component.

U.S. Pat. Publ. No. 2019/0338891 teaches a glass bulb with a SMD LED light embedded inside. While this approach is simple, the SMD LED light is at risk of shocking a user if the glass is broken since the electrical components of the LED are exposed.

While various LED glass bulbs are known, there remains a need for a simple LED glass bulb design that has fewer parts, is easier to manufacture, and is more reliable than conventional lights. It would also be advantageous to provide an LED glass bulb that is removable and interchangeable with other LED glass bulbs.

SUMMARY OF THE INVENTION

The inventive subject matter provides apparatus, systems, and methods in which a light device comprises a light emitting diode (LED) disposed inside a glass lumen, wherein a first lead wire and a second lead wire of the LED are disposed in a melted region of a sealed end of the glass lumen. The other sealed end of the glass lumen can be tapered and have a conical shape with a ball or sphere at the tip to resemble a common incandescent Christmas bulb.

In some embodiments, the light device is a miniature glass bulb having a diameter in the range of 4.0 and 6.0 mm, with a wall thickness in the range of 0.3 to 1.0 mm. The LED can have a diameter in the range of 3.5 to 5.5 mm, fitting inside the glass lumen.

From a methods perspective, the inventive subject matter comprises a method of manufacturing a light emitting diode (LED) glass bulb, comprising: (i) providing a glass tube having a first open end and a second open end separated by a longitudinal dimension; (ii) heating, pressing, and sealing the first end; (iii) placing the LED inside the glass tube such that a first lead wire and a second lead wire of the LED are disposed through the second opening; and (iv) heating, pressing, and sealing the second end while the first and second lead wires pass through the second end.

In some embodiments, the steps of heating, pressing, and sealing the first and second ends comprises applying fire or electric heat to the first and second open ends of the glass tube. The step of providing a glass tube having a first open end and a second open end separated by a longitudinal dimension can comprise the step of cutting a stock piece of glass tube to create a cut piece having the desired longitudinal dimension.

It is further contemplated that the LED can be placed inside the glass tube after the first end is sealed and before the second end is sealed. It is also contemplated that the LED can be placed inside the glass tube through an air tube in a heat-melting machine. However, in alternative embodiments the LED can be placed inside the glass tube after the second end is sealed and before the first end is sealed. In yet other embodiments, the LED can be placed inside the glass tube prior to either end being sealed.

Various objects, features, aspects and advantages of the inventive subject matter will become more apparent from the following detailed description of preferred embodiments, along with the accompanying drawing figures in which like numerals represent like components.

DETAILED DESCRIPTION OF THE INVENTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
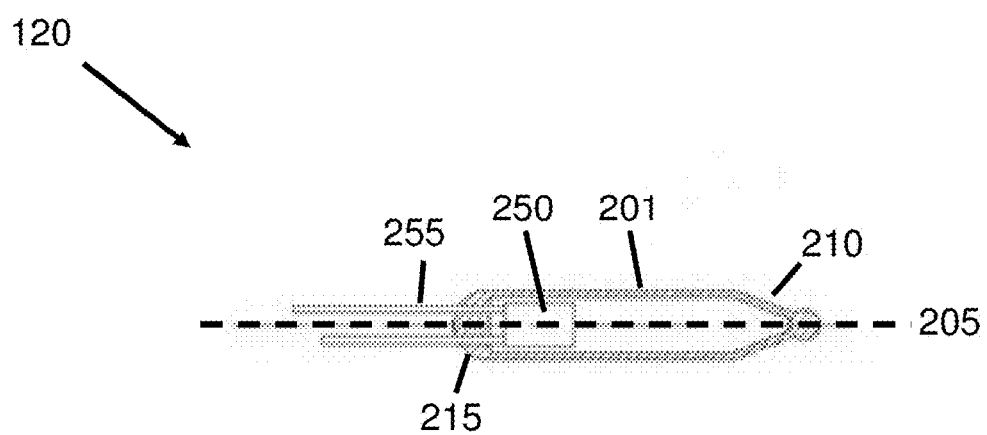
FIG. 1 is a cross-sectional view of the light device.

FIG. 1 shows a cross-sectional view of light device 120. Light device 120 comprises a glass tube 201 that has a longitudinal dimension 205, a first closed end 210, and a second closed end 215. Inside the lumen of glass tube 201 is a light emitting diode (LED) 250 with a pair of lead wires 255 exiting the lumen via second closed end 215. LED 250 comprises an electrically insulated housing that contains and encases the light emitting diode and related electrical components. In some embodiments, the insulated housing is made of a plastic. When LED 250 is disposed within glass tube 201, glass tube 201 acts as a second insulating shield to prevent shock or short circuiting.

Figure 2:
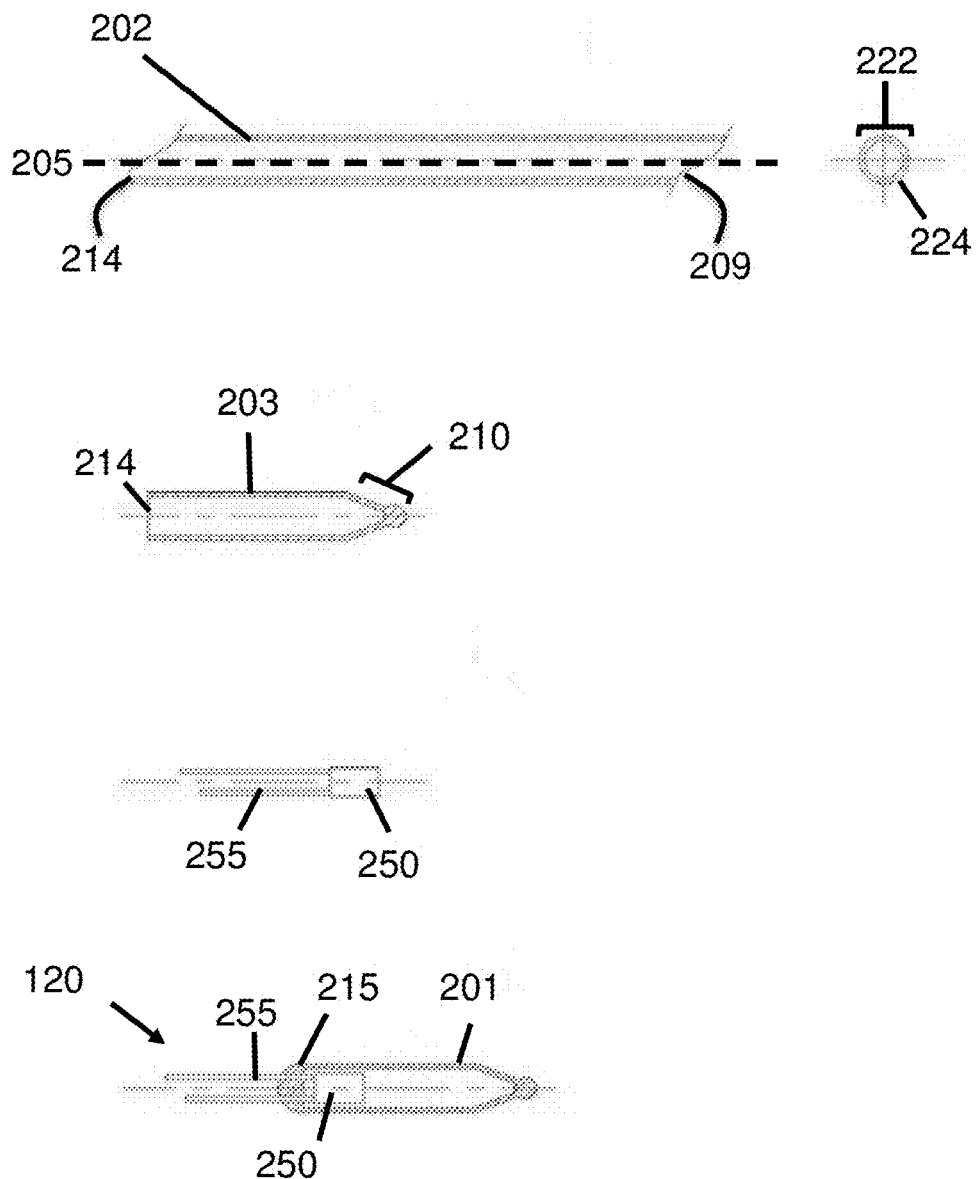
FIG. 2 is an illustration of a method of manufacturing the light device of FIG. 1.

FIG. 2 illustrates a method of producing light device 120. First, a glass tube 202 is providing having a lumen or interior space with a longitudinal dimension 205, a first open end 209, and a second open end 214. The lumen has an outer diameter 222 and a wall thickness 224.

The first open end 209 of glass tube 202 is heated, pressed, sealed close, and formed into first closed end 210. First closed end 210 has a tapered cross-sectional shape that is conical. The tip of the cone comprises a ball or sphere portion.

Next, a light emitting diode (LED) 250 with a pair of lead wires 255 is placed inside the lumen of partially closed glass tube 203 via open end 214.

Then, the open end 214 is heated, pressed, and sealed close over the pair of lead wires 255 to form closed end 215. Closed end 215 has a melted glass region encasing a portion of the pair of lead wires 255.

In alternative embodiments of the method of production, LED 250 can be placed inside glass tube 202 after open end 214 is heated, pressed, and sealed close but before open end 209 is heated, pressed, and sealed close. In yet other methods, LED 250 can be placed inside the lumen of glass tube 202 before either open end 209 or open end 214 is sealed close. As used herein, "sealed close" broadly means an opening is narrowed to restrict access and does not necessarily mean sealed airtight (e.g., nonpermeable). However, in some embodiments, open end 209 and open end 214 are sealed close in an airtight manner that prevents air or water from entering the lumen of glass tube 201.

Figure 3:
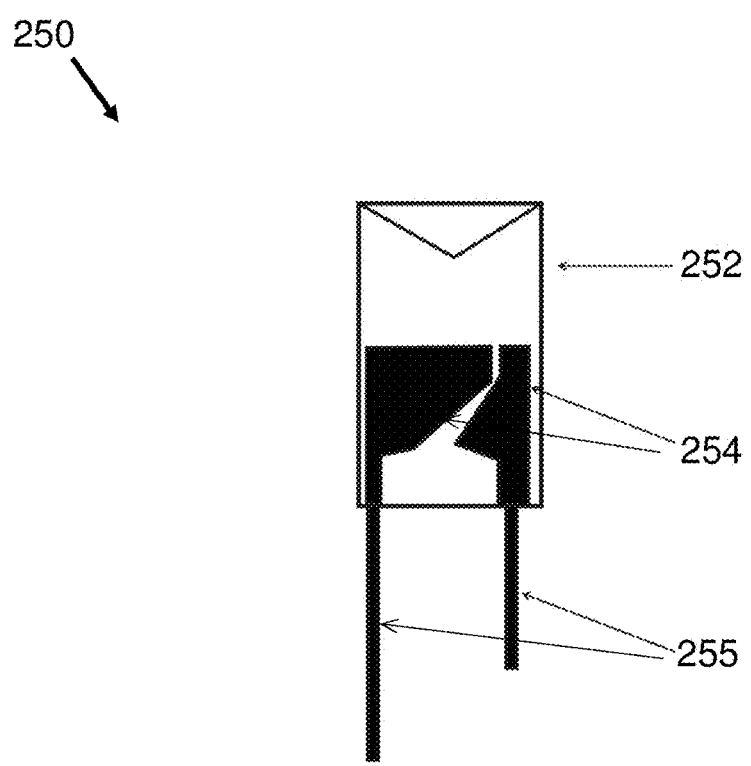
FIG. 3 is a close-up view of the light emitting diode in FIG. 1.

FIG. 3 shows a close-up view of LED 250. LED 250 comprises an epoxy resin case 252 that shields, protects, and encases cathode/anode 254. Cathode/anode 254 can be made of metals and metal alloys, including gallium nitride, zinc, lithium, copper, and silver. Lead wires 255 are directly connected with cathode/anode 254 and extend out of casing 252 and out of glass tube 201. Casing 252 provides a first layer of anti-shock protection that prevents a person from getting shocked should the glass tube 201 break. Glass tube 201 provides an additional layer of anti-shock protection to prevent the user from coming into contact with cathode/anode 254.

The advantage of the inventive subject matter disclosed herein is that a simple LED glass bulb can be provided as an alternative to the traditional Christmas style miniature filament bulb. By encasing the lead wires in a melted region of the glass bulb, the need for a socket and/or additional components is eliminated. The design can be used to produce a high volume of miniature bulbs.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the amended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification refers to at least one of something selected from the group consisting of A, B, C . . . and N, the text should be interpreted as requiring only one element from the group, not A plus N, or B plus N, etc.

What is claimed is:

1. A light device comprising:
   a glass lumen having a longitudinal dimension, a first closed end, and a second closed end;
   a light emitting diode (LED) comprising an anode and a cathode enclosed in a plastic casing, a first lead wire coupled with the anode and extending out from the plastic casing, and a second lead wire coupled with the cathode and extending out from the plastic casing; and
   wherein the plastic casing is disposed inside the glass lumen and the first lead wire and the second lead wire are disposed in a melted region of the first closed end of the glass lumen and extend outside of the glass lumen.

2. The light device of claim 1, wherein the second closed end has a tapered cross section the ends at a sphere.

3. The light device of claim 2, wherein the sphere is formed by heating and pressing an open end of a glass tube.

4. The light device of claim 1, wherein the first closed end is formed by heating and pressing an open end of a glass tube while the first and second lead wires are disposed through the open end.

5. The light device of claim 1, wherein the glass lumen is formed by heating open ends of a glass tube.

6. The light device of claim 5, wherein the glass tube is heated using fire or electric heating.

7. The light device of claim 1, wherein the glass lumen has a diameter in the range of 4.0 and 6.0 mm.

8. The light device of claim 7, wherein the glass lumen has a wall thickness in the range of 0.3 to 1.0 mm.

9. The light device of claim 1, wherein the LED has a diameter in the range of 3.5 to 5.5 mm.

* * * * *

(12) EX PARTE REEXAMINATION CERTIFICATE (12940th)
United States Patent
Yang

(10) Number: US 11,002,423 C1
(45) Certificate Issued: Jun. 23, 2025

(54) GLASS LED BULB AND METHOD OF PRODUCTION

(71) Applicant: Lamues Light Enterprise Co., LTD, Phnom Penh (KH)

(72) Inventor: Feng Yang, Dongguan (CN)

(73) Assignee: LAMUES TECHNOLOGY CO., LTD, Kong Pisey District (KH)

Reexamination Request:
No. 90/019,634, Aug. 27, 2024

Reexamination Certificate for:
Patent No.: 11,002,423
Issued: May 11, 2021
Appl. No.: 16/909,257
Filed: Jun. 23, 2020

(51) Int. Cl.
*F21V 21/00* (2006.01)
*C03B 23/18* (2006.01)
*F21K 9/90* (2016.01)
*F21V 3/06* (2018.01)
*F21V 23/00* (2015.01)
*F21V 31/00* (2006.01)
*F21Y 115/10* (2016.01)

(52) U.S. Cl.
CPC .............. *F21V 3/061* (2018.02); *C03B 23/18* (2013.01); *F21K 9/90* (2013.01); *F21V 23/001* (2013.01); *F21V 31/005* (2013.01); *F21Y 2115/10* (2016.08)

(58) Field of Classification Search
None
See application file for complete search history.

(56) References Cited

To view the complete listing of prior art documents cited during the proceeding for Reexamination Control Number 90/019,634, please refer to the USPTO's Patent Electronic System.

*Primary Examiner* — James A Menefee

(57) ABSTRACT

A light device comprising a light emitting diode (LED) enclosed in a glass tube is described. The first closed end of the glass tube has a tapered cross section with a conical shape and a ball at the tip. The second closed end of the glass tube has a melted region encasing a pair of lead wires that pass into the lumen of the glass tube and connect to the LED.

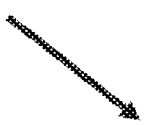

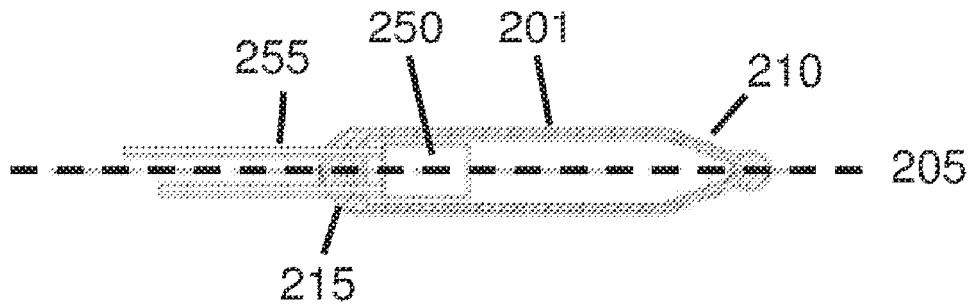

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-9 are cancelled.

\* \* \* \* \*